Sept. 1, 1964 C. T. PRUCHA 3,146,872
AUTOMATIC BRAKE SYSTEM
Filed July 1, 1963
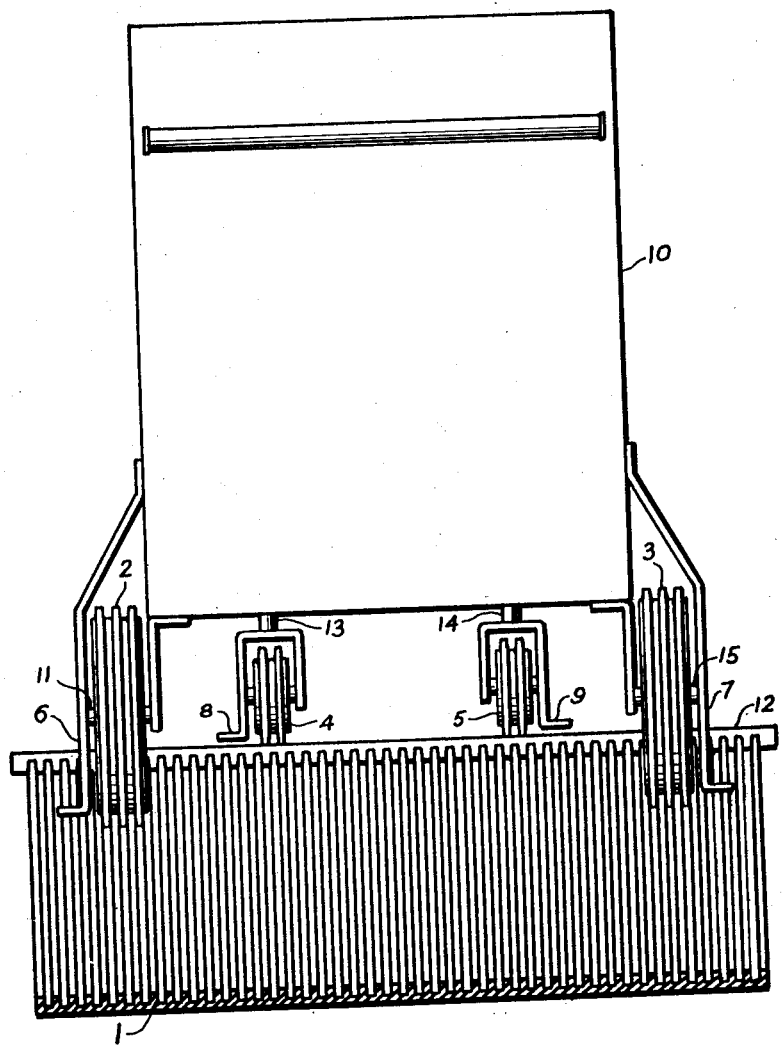
INVENTOR
CARL T. PRUCHA
BY Maybee & Legris
ATTORNEYS 3,146,872
AUTOMATIC BRAKE SYSTEM
Carl T. Prucha, Toronto, Ontario, Canada, assignor, by mesne assignments, to Turnbull Elevator Limited, Toronto, Ontario, Canada
Filed July 1, 1963, Ser. No. 291,776
Claims priority, application Canada July 14, 1962
8 Claims. (Cl. 198—16)

The invention relates to a braking system for wheeled vehicles, the system operating automatically when a vehicle is on a designated surface, for instance a conveyor belt.

A typical use is for shopping carts for department stores. A ramp type conveyor belt is generally provided for conveying customers and carts from one floor to another. Since the belt slope may be approximately ten degrees, considerable force is required to prevent a heavily laden cart from rolling.

One type of brake previously designed for this purpose requires manual application by the customer, who may forget to apply it on entering the ramp, or to release it on leaving the ramp.

Another type makes use of the ramp angle to actuate the brake initially, and self-actuation completes the setting of the brake. This type is subject to accidental brake application when the cart is accelerated in a horizontal plane, and the brake may have difficulty in releasing automatically.

Still another type consists of a magnet slung under the cart and attracted to a magnetic material in the conveyor belting. This requires a relatively heavy magnet to produce a limited braking force. It is also necessary that the comb plates at the ends of the conveyor belt, and all other floor area, be constructed of non-magnetic material. Frequent cleaning is required to remove metallic debris picked up by the magnets.

All these disadvantages are avoided by the simple system disclosed herein. Further advantages of this system are that no moving parts are required on the vehicle and the braking force developed is substantially proportionate to the weight of the loaded cart, so that the tendency to slip is independent of load.

The braking system will now be described with reference to the accompanying drawing, as applied to a typical shopping cart which is to be transported from one floor level to another on an endless conveyor belt. The drawing shows the rear of a shopping cart that is being carried upwardly on a conveyor belt, the front wheels of the cart having run off the belt.

The surface of a conveyor belt 1 consists of a resilient material, moulded in a typical cross-sectional configuration consisting of equally spaced lengthwise ridges of trapezoidal cross section. The ridges pass between the fingers of a comb plate 12.

A push cart 10 has four rubber tired wheels 2, 3, 4, and 5 the resilient peripheries of which are grooved to mate with the ridges and slots of the conveyor belts. Metal brake pads 6 and 7, adjacent the rear wheels 2 and 3 respectively, are directly fastened to the cart body 10, while similar brake pads 8 and 9, adjacent the front wheels 4 and 5 respectively, are fastened to the body 10 through vertical swivel shafts 13 and 14 respectively.

The cart is shown travelling upwardly with the conveyor belt and arriving at the top of the ramp, the rear wheels 2 and 3 being still engaged with the belt, while the front wheels 4 and 5 are resting on the plane upper surface of the comb plate 12. Note that the brake pads 8 and 9 clear the comb plate surface by an amount less than the depth of the grooves in the wheels, so that the cart can roll freely on the front wheels, but brake pads 6 and 7 rest on the ridges of the belt surface, supporting the weight of the rear of the cart and effectively locking the cart to the belt. The rear wheels 2 and 3 are free to spin on axes 11 and 15 respectively.

As the rear wheels arrive at the comb plate 12, the ridges on the peripheries of wheels 2 and 3 ride up on the comb plate fingers, lifting brake pads 6 and 7 clear of the belt surface, and permitting the cart to be rolled away.

When the cart is rolled onto the conveyor belt, the front wheels 4 and 5 run down comb plate 12 onto belt 1. Either wheel 4 or 5 or both may be satisfactorily located laterally to drop into the surface of belt 1, in which case brake pad 8 or 9 will contact the surface of the belt and assist in drawing the cart onto the conveyor. If not, the cart will continue to roll on all four wheels until the rear wheels roll down the comb plate onto the belt. Either wheel 2 or 3 will ultimately fall into the belt surface, causing brake pad 6 or 7 to land on the belt surface.

The front wheels 4 and 5 are free to swivel on the vertical shafts 13 and 14 respectively, in a caster motion. Assume that neither front wheel has dropped into the belt, and that only one rear wheel has dropped, say wheel 2, so that brake pad 6 rests on the belt surface. The cart will then swivel about brake pad 6, until either front wheel 4 or 5, or rear wheel 3 drops into registry, so that brake pad 8, 9 or 7 will then rest on the belt surface to assist in braking the cart.

As a possible assistance to faster registry of the wheel grooves with the belt ridges, the circumferentially extending wheel grooves may form a helical or wavy pattern on the cylindrical wheel surface, provided that a constant groove pitch is maintained. Also, for other configurations of belt ridges, a corresponding change in the wheel grooving is required. For example, with crosswise belt ridging, wheel grooves parallel to the wheel axes are required.

It is possible to make the downwardly facing surfaces of the brake pads so limited in area as to obtain the gripping advantage of an appreciable indentation into the belt ridges. Each pad should be substantially in a vertical plane containing the adjacent wheel axle, so that inclination of the cart as it enters or leaves the ramp conveyor does not cause the brake pad to dig into the floor.

It may be possible to obtain adequate braking by means of braking pads on the rear wheels only, in which case the front wheels need not be grooved.

What I claim as my invention is:

1. A vehicle adapted to be carried by a conveyor having a slotted surface, the vehicle having wheels on which the vehicle can roll when off said surface, at least one of the wheels having a configuration that registers with said surface whereby when the vehicle is on the conveyor said one of the wheels can drop into said surface, the vehicle having adjacent said one of the wheels a brake pad engageable with said surface when said one of the wheels drops into said surface whereby the brake pad carries at least part of the weight of the vehicle and thus brakes the vehicle with respect to the conveyor.

2. A vehicle as claimed in claim 1, wherein the brake pad is substantially in a vertical plane containing the axis of said one of the wheels.

3. A vehicle adapted to be carried by an inclined conveyor having a ridged surface consisting of a plurality of equally spaced apart longitudinal ridges, the vehicle having wheels on which the vehicle can roll when off said surface, the wheels having in their peripheries circumferentially extending grooves that mate with the ridges of said surface whereby when the vehicle is rolled onto the conveyor the wheels can drop into said surface, the vehicle having brake pad means at such a height as to engage said surface when a wheel drops into said surface whereby the brake pad means carry at least part of the weight of the vehicle and thus brake the vehicle with respect to the conveyor.

4. A vehicle as claimed in claim 3, wherein when the wheels rest on a plane surface the height of the brake pad means above the plane surface is less than the depth of the grooves.

5. A vehicle adapted to be carried by an inclined conveyor having a ridged surface consisting of a plurality of equally spaced apart longitudinal ridges separated by grooves, the vehicle having wheels on which the vehicle can roll when off said surface, the wheels having in their peripheries circumferentially extending grooves and ridges that mate with the ridges and grooves of said surface whereby when the vehicle is rolled onto the conveyor the wheels can drop into said surface, the vehicle having adjacent each wheel a brake pad fixed at such a height on the vehicle that it does not impede rolling the vehicle when off said surface but that it engages said surface when the adjacent wheel drops into said surface whereby part of the weight of the vehicle is transferred to said surface through the pad and the vehicle is braked with respect to the conveyor.

6. An automatic brake system for a wheeled vehicle, comprising a ridged surface consisting of equally spaced parallel ridges on which the vehicle is to be braked, at least one of the wheels of the vehicle being grooved in its periphery to mate with the ridges, and a brake pad fixed in height relative to the body of the vehicle in proximity to said grooved wheel, the pad having a downwardly facing friction surface, the brake pad having running clearance from a smooth plane surface on which the vehicle usually runs, but its height being such that when said grooved wheel mates with the ridged surface the brake pad engages the ridged surface and at least some of the weight of the vehicle is transferred to the ridged surface through the friction surface of the brake pad, thus effectively braking the vehicle when it is on the ridged surface.

7. A system as claimed in claim 6, wherein the ridged surface is the surface of an inclined conveyor belt and the wheeled vehicle is a push cart.

8. A system as claimed in claim 7, wherein the ridges of the conveyor belt pass between fingers of a comb plate whereby said grooved wheel can ride up on the comb plate and off the belt.

References Cited in the file of this patent
UNITED STATES PATENTS
3,115,975    Thompson _____ Dec. 31, 1963